F. J. LAHER.
LAMINATED SPRING.
APPLICATION FILED JULY 25, 1916.

1,204,037.

Patented Nov. 7, 1916.

Inventor.
Frank J. Laher.
By T. J. Geisler
Atty.

UNITED STATES PATENT OFFICE.

FRANK J. LAHER, OF PORTLAND, OREGON.

LAMINATED SPRING.

1,204,037. Specification of Letters Patent. Patented Nov. 7, 1916.

Application filed July 25, 1916. Serial No. 111,250.

*To all whom it may concern:*

Be it known that I, FRANK J. LAHER, a citizen of the United States, and a resident of the city of Portland, county of Multnomah, State of Oregon, have invented a certain new and useful Improvement in Laminated Springs, of which the following is a specification.

My invention relates to laminated springs, and especially to those intended for vehicles. It is desirable to fasten the leaves of the spring together at the middle portion in order to prevent longitudinal and lateral displacement. This has heretofore generally been done by means of a bolt, or by making the opposed faces of the leaves with companion studs and cavities. The former has a tendency to weaken the leaves by requiring perforations for the bolt, and the latter mode requires special handling of each leaf, and, besides also has a tendency to weaken the leaf.

The purpose of my invention is to fasten the leaves of the spring rigidly together by comparatively inexpensive, practical and very efficient means, not tending to weaken the leaves of the spring.

Figure 1:
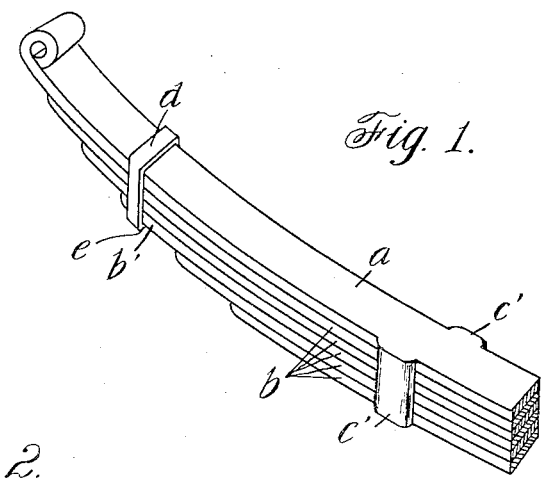
Figure 2:
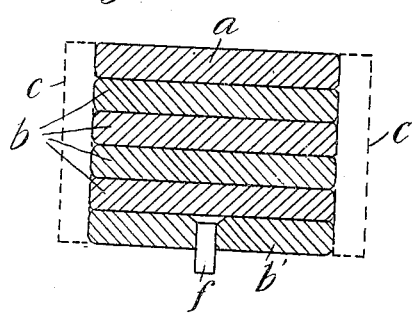
Figure 3:
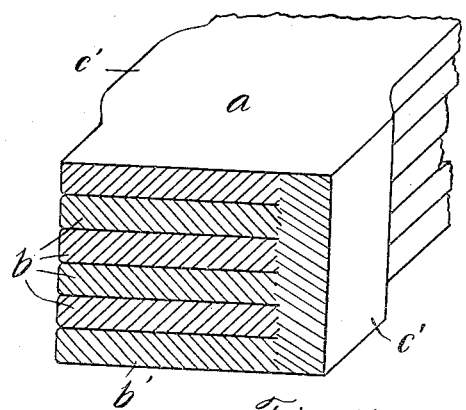
Figure 4:
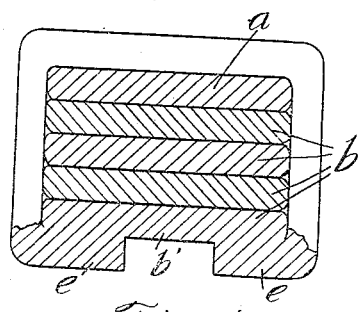

I attain my object by welding wrought iron tie-straps to both sides of the leaves, or adjacent their middle portion, after having been assembled, and I prefer to carry out my invention as illustrated in the accompanying drawings, in which:

Figure 1 shows a perspective side elevation of my improved spring; Fig. 2 diagrammatically represents a cross-section of the spring, showing bars positioned ready for being welded to the sides of the assembled leaves of the spring to thereby rigidly fasten the same together; Fig. 3 is a diagrammatic perspective cross-section showing the tie-straps as welded to the side edges of the leaves; and Fig. 4 is a cross-section of the spring adjacent one of the keeper straps secured near the ends of the spring to prevent lateral movement of the leaves of the spring and also to cause them to act in unison.

It would appear that the simplest mode of obtaining the end in mind would be to weld the middle portions of the leaves of the spring together so as to form an integral mass, but the difficulties of so doing, and the undesirable effects which may result, suggest themselves to all conversant with the art. In short, such mode of procedure is impractical.

$a$ represents the uppermost spring leaf, and $b$ the underlying leaves. After the leaves have been properly assembled, I apply at the middle thereof wrought iron bars $c$, as shown in Fig. 2, and these bars are then welded to the edges of the leaves by any suitable method, preferably by an electric welding apparatus, and when so welded in place become tie-straps $c'$, $c'$ as shown in Fig. 1. These tie-straps should be welded to the sides of the leaves at the middle or adjacent the middle of the spring. I prefer to stagger the tie-straps, as shown in Fig. 1, that is to say, bringing the tie-strap on the near side, for example, a little to the left of the middle, and the opposite tie-strap a little to the right of the middle. The advantage of so doing is, that it avoids the danger of applying too much heat to the leaves at one place in welding the tie-straps onto their sides, and thus avoids any deterioration of the spring members or affecting their temper. On the other hand, if both tie-straps are welded at the middle, that is, opposite to each other, it is evident that the leaves of the spring would be subjected to a much greater degree of heat. The fact is, that the heat applied in welding the bars $c$ to the sides of the leaves of the spring merely heats about one-sixteenth of an inch of the edges of the leaves, which is sufficient to weld the bars $c$ to such edges. The bars themselves, during the welding process are, however, rendered sufficiently viscous to cause the metal to flow in the crevices between the leaves, and thus form with the edges of the latter an integral mass as illustrated in Fig. 3.

It is evident that the tie-straps $c'$ perform the double function of not only holding the leaves of the spring against longitudinal movement, but also against lateral movement. But to relieve any torsional, lateral strain upon the leaves, and also to hold them so close together as to act in unison, I fasten at each end of the spring a strap-like keeper $d$, as shown in Figs. 1 and 4. This keeper consists of a strap of wrought iron, which is bent around the leaves, as shown, and the lower portions $e$, $e$ are bent in claw-like form and are welded to the edges of the lowermost leaf $b'$. The entire process of applying the tie-straps $c'$ and the keeper straps $d$ to the spring is very quickly performed, and imparts to the spring, as a whole, great durability. In the lowermost leaf $b'$ may be inserted a projecting stud $f$, for seating the spring on a support.

I claim:

1. An improved laminated spring comprising a plurality of leaves, and a tie-strap welded to the edges of the leaves at the middle portion of the spring.

2. An improved laminated spring comprising a plurality of leaves, and a tie-strap welded to the edges of both sides of the leaves, the tie-straps being oppositely spaced from the middle of the spring.

3. An improved laminated spring comprising a plurality of leaves, and a tie-strap welded to the edges of both sides of the leaves at the middle portion of the spring.

4. An improved laminated spring comprising a plurality of leaves, a tie-strap welded to the edges of the leaves at the middle portion of the spring, and supplemental tie-straps, or keepers, encompassing the leaves at the ends of the springs.

5. An improved laminated spring comprising a plurality of leaves, a tie-strap welded to the edges of the leaves at the middle portion of the spring, supplemental tie-straps, or keepers, encompassing the leaves at the ends of the springs, and one of the outermost leaves having an outwardly projecting stud-pin inserted therein.

6. An improved laminated spring encompassing a plurality of leaves, a tie-strap welded to the edges of the leaves at the middle portion of the spring, and one of the outermost leaves having an outwardly projecting stud-pin inserted therein.

7. An improved laminated spring comprising a plurality of leaves, a tie-strap welded to the edges of both sides of the leaves at the middle portion of the spring, and supplemental tie-straps, or keepers, encompassing the leaves at the ends of the springs.

8. The method of securing the leaves of a laminated spring against displacement which consists in applying a bar to the edges of the assembled leaves, and then welding such bar to said edges and causing the metal of the bar, in the welding process, to run into the crevices between the leaves at their edges, and form with such edges an integral mass.

FRANK J. LAHER.